United States Patent
Foladare et al.

(10) Patent No.: US 10,575,121 B2
(45) Date of Patent: *Feb. 25, 2020

(54) SYSTEM AND METHOD FOR INSTANTIATION OF SERVICES AT A LOCATION BASED ON A POLICY

(71) Applicant: AT&T Intellectual Property I, L.P., Atlanta, GA (US)

(72) Inventors: Mark Jeffrey Foladare, East Brunswick, NJ (US); Robert M. Higgins, Manasquan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/588,069

(22) Filed: May 5, 2017

(65) Prior Publication Data

US 2017/0245109 A1    Aug. 24, 2017

Related U.S. Application Data

(63) Continuation of application No. 14/549,082, filed on Nov. 20, 2014, now Pat. No. 9,674,343.

(51) Int. Cl.
*H04W 4/00* (2018.01)
*H04W 4/021* (2018.01)
*H04W 4/029* (2018.01)
*H04L 29/08* (2006.01)

(52) U.S. Cl.
CPC .......... *H04W 4/021* (2013.01); *H04W 4/029* (2018.02); *H04L 67/10* (2013.01)

(58) Field of Classification Search
CPC ... H04W 4/021; H04W 4/02; H04M 3/42221; H04M 3/42; H04M 2203/301; H04L 67/10

See application file for complete search history.

(56) References Cited

U.S. PATENT DOCUMENTS

| | | | |
|---|---|---|---|
| 8,756,322 B1 * | 6/2014 | Lynch | H04L 47/62 709/226 |
| 2006/0190986 A1 * | 8/2006 | Mont | H04L 41/0893 726/1 |

(Continued)

FOREIGN PATENT DOCUMENTS

| | | |
|---|---|---|
| GB | 2507105 A | 10/2012 |
| KR | 2012072907 A | 7/2012 |
| KR | 1304452 B1 | 9/2013 |

OTHER PUBLICATIONS

Schoorl, Joseph A., "Clicking the Export Button: Cloud Data Storage and US Dual-Use Export Controls", Geo. Wash. L. Rev. 80 (2011), 36 pgs.

(Continued)

*Primary Examiner* — Clemence S Han
(74) *Attorney, Agent, or Firm* — Hartman & Citrin LLC (57) ABSTRACT

A request to instantiate a first service is received. The first service is subject to policy constraints including a location. It is determined that a first set of resources at the location is required for instantiation of the first service. The first set of resources is reallocated to the first service from a second service. The first service is instantiated at the location utilizing the first set of resources reallocated.

11 Claims, 7 Drawing Sheets

(56) References Cited

U.S. PATENT DOCUMENTS

| | | | | |
|---|---|---|---|---|
| 2011/0119381 A1* | 5/2011 | Glover | G06F 9/5072 | 709/226 |
| 2011/0282975 A1* | 11/2011 | Carter | G06F 9/5055 | 709/220 |
| 2012/0084443 A1* | 4/2012 | Theimer | G06F 9/45533 | 709/226 |
| 2013/0054780 A1* | 2/2013 | Bade | H04L 67/18 | 709/224 |
| 2013/0110985 A1* | 5/2013 | Shekher | H04L 67/18 | 709/219 |
| 2013/0219067 A1* | 8/2013 | Boss | H04L 67/306 | 709/226 |
| 2013/0268588 A1* | 10/2013 | Chang | H04L 12/6418 | 709/204 |
| 2013/0268672 A1* | 10/2013 | Justafort | H04L 67/10 | 709/226 |
| 2013/0311551 A1* | 11/2013 | Thibeault | G06F 9/5055 | 709/203 |
| 2014/0089510 A1* | 3/2014 | Hao | G06F 9/5072 | 709/226 |
| 2014/0101137 A1* | 4/2014 | Satyanarayanan | H04L 67/306 | 707/722 |
| 2014/0181155 A1* | 6/2014 | Homsany | G06F 17/3028 | 707/812 |
| 2014/0181267 A1* | 6/2014 | Wadkins | H04L 69/163 | 709/219 |
| 2014/0229945 A1* | 8/2014 | Barkai | H04L 49/70 | 718/1 |
| 2014/0244842 A1* | 8/2014 | Rosensweig | G06F 9/5072 | 709/226 |
| 2015/0006733 A1* | 1/2015 | Khan | H04L 47/70 | 709/226 |
| 2015/0134424 A1* | 5/2015 | Matzlavi | G06Q 10/0637 | 705/7.36 |
| 2015/0163157 A1* | 6/2015 | Hao | G06F 9/5072 | 709/226 |
| 2015/0271092 A1* | 9/2015 | Ward, Jr. | H04L 67/10 | 709/226 |
| 2016/0142338 A1* | 5/2016 | Steinder | H04L 41/0813 | 709/226 |
| 2016/0301598 A1* | 10/2016 | Strijkers | H04L 67/34 | |
| 2017/0353394 A1* | 12/2017 | Brandwine | G06F 9/5077 | |

OTHER PUBLICATIONS

"Hypervisor", Wikipedia, retrieved from http://en.wikipedia.org/wiki/Hypervisor on Nov. 18, 2014, 7 pgs.
U.S. Office Action dated Aug. 4, 2016 in U.S. Appl. No. 14/549,082.
U.S. Notice of Allowance dated Feb. 9, 2017 in U.S. Appl. No. 14/549,082.

* cited by examiner

| RESOURCES | LOCATION | POLICY GOVERNING A FIRST SERVICE | POLICY GOVERNING A SECOND SERVICE | POLICY GOVERNING A THIRD SERVICE | ... |
|---|---|---|---|---|---|
| FIRST SET | MALIBU | X | | | ... |
| SECOND SET | CALABASAS | X | X | | ... |
| THIRD SET | OREGON | | | X | ... |
| ... | ... | ... | ... | ... | |

SYSTEM AND METHOD FOR INSTANTIATION OF SERVICES AT A LOCATION BASED ON A POLICY

This application is a continuation of prior U.S. patent application Ser. No. 14/549,082, filed Nov. 20, 2014, now U.S. Pat. No. 9,674,343, the disclosure of which is herein incorporated by reference in its entirety.

FIELD

The present disclosure relates generally to a system and method for instantiation of services at a location based on a policy and more particularly to a system and method for instantiation of services at a location based on a policy by reallocating resources.

BACKGROUND

In current computer systems, a customer such as a local government agency may require a custom product or service that performs a certain function. For example, the customer may wish to request a service that is able to capture and record all incoming and outgoing telephone calls placed within a location boundary governed by the local government agency. A law or policy may state that all telephone calls that are captured and/or recorded by the local government agency must be performed on resources that are located within the location boundary and that such resources may not be moved to a different location outside the boundary. The customer may place the request for the service with a telecommunications company and inform the telecommunications company about the law or policy. In order to provide the customer with the requested service, a dedicated hardware system (or multiple systems) running custom software is needed. The hardware system and/or software is referred to herein as resources. The telecommunications company must adhere to the law or policy when providing the service that captures and records telephone calls to the customer.

The telecommunications company may create a data center (or create or dedicate the resources at an existing data center) within the location of the local government agency in order to provide the product or service.

If the order for a product or service to be created that is subject to a policy that states that the instantiation and storage of the product or service is limited to a particular location or location boundary (e.g., within a certain radius, within a city, within a county, within a state, within a country, within a continent, etc.), dedicated hardware and software must be physically located in that location. Implementation of such dedicated hardware and software is costly because dedicated hardware is placed (and/or existing hardware within a data center within the location is chosen) within the particular location to be solely dedicated to the product or service. If the product or service requires additional resources, then additional hardware must be brought into the particular location of the data center. Resources include data resources, networking resources (routers, compute fiber), etc., that might have to be dedicated and deployed to the particular service at the specific location. There may be a delay in bringing in and setting up additional hardware thereby creating an overloaded and slow service. When less resources are required than available, there is no way to reallocate those resources to any other project, as the resources are dedicated to the particular product or service. This creates an inefficient system.

BRIEF SUMMARY

The present application provides a method, system and computer readable medium for instantiating a service. A request to instantiate a first service is received. The first service is subject to policy constraints including a location. It is determined that a first set of resources at the location is required for instantiation of the first service. The first set of resources is reallocated to the first service from a second service. The first service is instantiated at the location utilizing the first set of resources reallocated.

In accordance with an embodiment, a search is performed for the first set of resources required for the instantiating the first service by mapping the policy constraints against the first set of resources in order to determine that the first set of resources is required for the instantiation of the first service.

In accordance with an embodiment, the first set of resources includes storage, compute and network. The first set of resources is spun-up virtually by a cloud server at the location.

In accordance with an embodiment, a request to instantiate a third service in real-time is received. The third service is subject to policy constraints including a second location. A request to instantiate a fourth service is received. It is determined that a second set of resources at the second location is required for instantiation of the third service and the fourth service. Instantiation of the third service is prioritized over the fourth service by delaying instantiation of the fourth service. The second set of resources is allocated to the third service. The third service is instantiated at the second location substantially in real-time by utilizing the second set of resources.

In accordance with an embodiment, the fourth service is instantiated at the second location by utilizing the second set of resources. Data related to the fourth service instantiated at the second location is stored. A request is received to instantiate a fifth service subject to policy constraints including the second location. It is determined that the second set of resources at the second location is required for instantiation of the fifth service. The data related to the fourth service instantiated is transferred to a different location. The second set of resources is reallocated to the fifth service from the fourth service. The fifth service is instantiated at the second location utilizing the second set of resources reallocated.

In accordance with an embodiment, the fourth service is not subject to any policy constraints.

In accordance with an embodiment, a request to modify the first service is received. It is determined that a second set of resources at the location is required for modification of the first service. The first set of resources is reallocated to the first service from a second service. The first service is instantiated at the location utilizing the first set of resources reallocated.

In accordance with an embodiment, it is determined that the first set of resources is being utilized by the second service. The second service is moved to a different location.

These and other advantages of the invention will be apparent to those of ordinary skill in the art by reference to the following detailed description and the accompanying drawings.

DETAILED DESCRIPTION

Policies governing instantiation, execution, and/or storage of data, software/applications and/or network connectivity (referred to as cloud functions), including legal policies, provide strict guidelines for where these cloud functions for a particular service or product are to be stored. Governments around the world are implementing laws requiring instantiation, execution, and/or storage of data, software/applications and/or network connectivity (cloud functions) to remain within a country. Described below is a method and system for providing services and products to customers, while adhering to policies using a framework of a global virtualized network such as a cloud network.

Suppose a particular country concerned with national security wishes to set up a system for message and voice networking and recording within the particular country. A policy may require that computing, processing and storage functions for the system remain within the particular country. A telecommunication carrier in that particular country may have a global footprint and a cloud network, but for purposes of providing the system, all traffic involving telephone numbers within the country, Internet Protocol (IP) addresses originating from and destined to the country, residents of the country, etc., must be redirected so that all data captured and recorded stays within the country.

Figure 1:
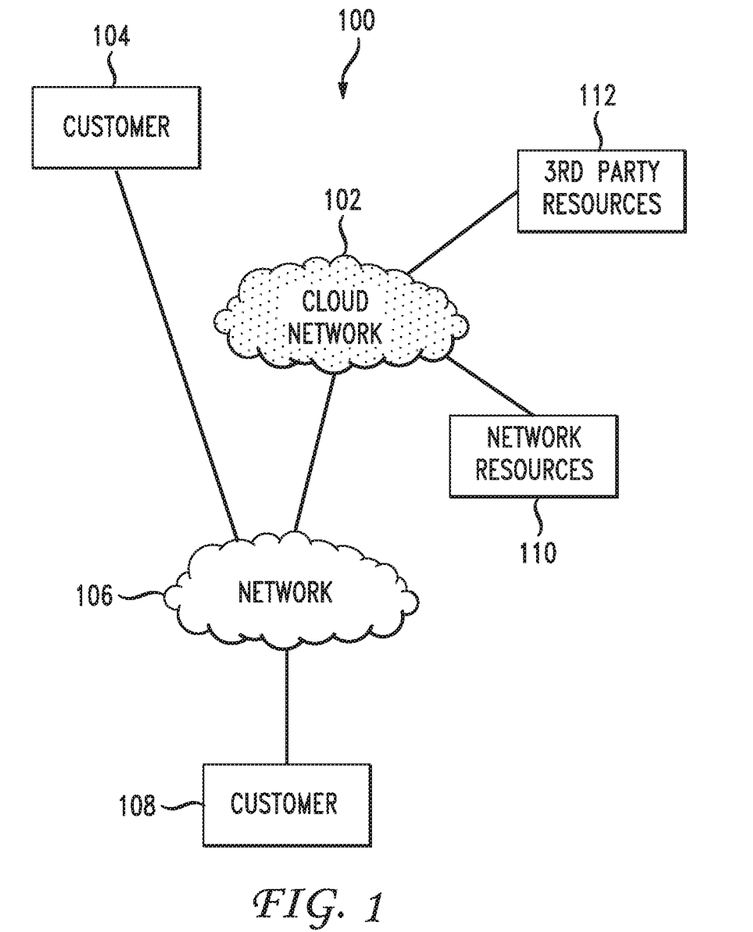
FIG. 1 depicts a system for communicating a request for a product or service, in accordance with an embodiment.

FIG. 1 depicts a system for communicating a request for a product or service, in accordance with an embodiment. The product or service requested captures and/or records data, such as telecommunications data. System 100 includes a cloud network 102, a customer 104, a network 106, a customer 108, network resources 110, and third party resources 112. System 100 may include fewer or additional customers than those depicted in FIG. 1.

Customer 104 and/or customer 108 can place an order for a product or service with cloud network 102, via network 106. If the customer wishes to place an order for a service that captures all incoming and outgoing telecommunications and electronic data within a location (e.g., a city, a county, a state, etc.), the customer can request the service from cloud network 102. Cloud network 102 may be operated by a telecommunications company or another company.

In the exemplary embodiment of FIG. 1, network 106 is the Internet. In other embodiments, network 106 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 106 may include a combination of different types of networks.

Figure 2:
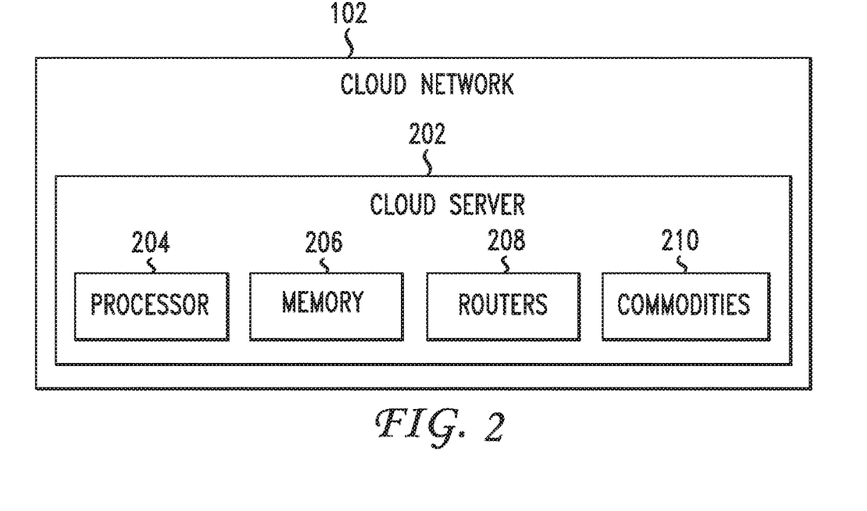
FIG. 2 depicts functional and structural components of a cloud network, in accordance with an embodiment.

FIG. 2 depicts functional and structural components of a cloud network, in accordance with an embodiment. Cloud network 102 includes a cloud server 202. Cloud server 202 includes a processor 204, a memory 206, routers 208, and commodities 210. Routers 208 are part of the cloud network and forward data packets between cloud network 102 and other networks. Commodities 210 include other hardware that can be custom hardware or commercial off-the-shelf hardware. Memory 206 includes a storage for storing details regarding a customer's orders. For example, the storage may include details regarding a policy that is set forth which the customer's order must comply with.

Figure 3:
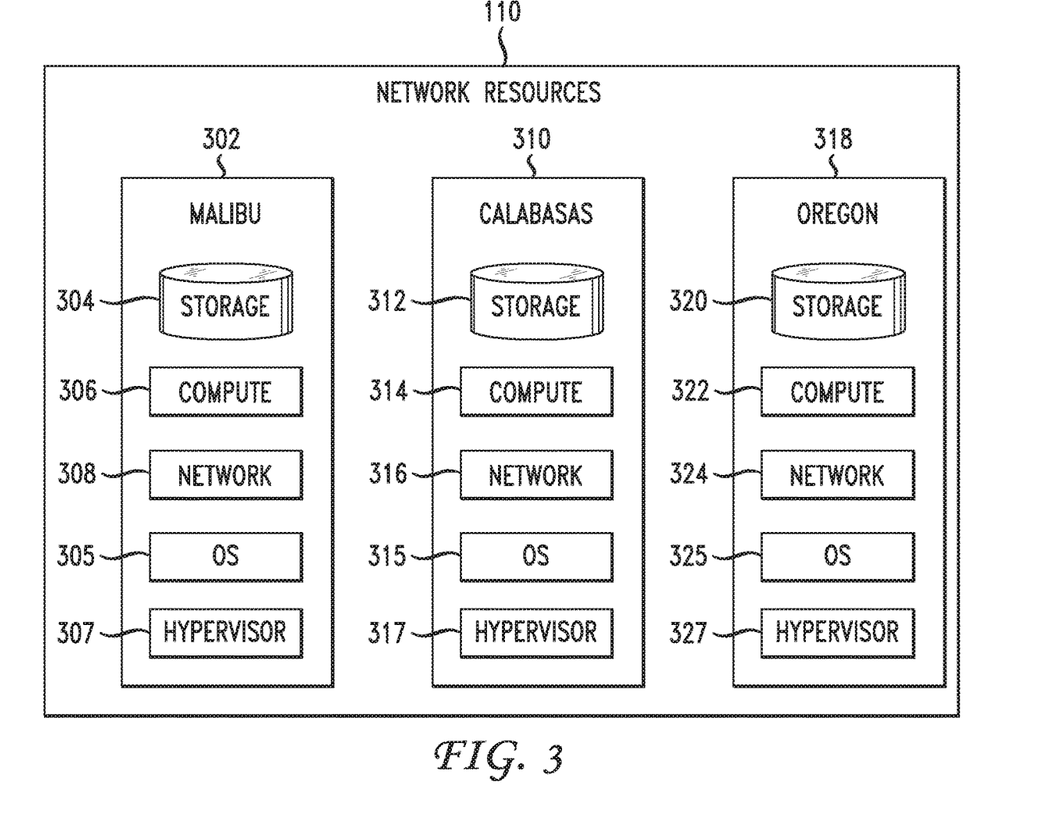
FIG. 3 depicts functional components of network resources, in accordance with an embodiment.

FIG. 3 depicts functional components of network resources, in accordance with an embodiment. Network resources 110 include a first set of network resources 302, a second set of network resources 310 and a third set of network resources 318. First set of network resources 302 is located in location A (for example, Malibu) and includes storage 304, compute 306, network 308, operating system (OS) 305, and hypervisor 307. Second set of network resources is located in location B (for example, Calabasas) and includes storage 312, compute 314, network 316, OS 315, and hypervisor 317. Third set of network resources 318 is located in location C (for example, Oregon) and includes storage 320, compute 322, network 324, OS 325, and hypervisor 327. Each of hypervisors 307, 317, and 327 runs one or more virtual machines (guest machines). Each of hypervisors 307, 317, and 327 runs on a respective computer referred to as a host machine. Each of hypervisors 307, 317, and 327 presents OS 305, 315, and 325, respectively, with a virtual operating platform and manages execution of OS 305, 315, and 325, respectively. Additional operating systems than shown in FIG. 3 may be included. Other software management layers used to implement the cloud functions may be included. Additional sets of resources than depicted and additional resources than depicted per set may be included. In an embodiment, a location may have multiple sets of resources associated with it.

Figure 4:
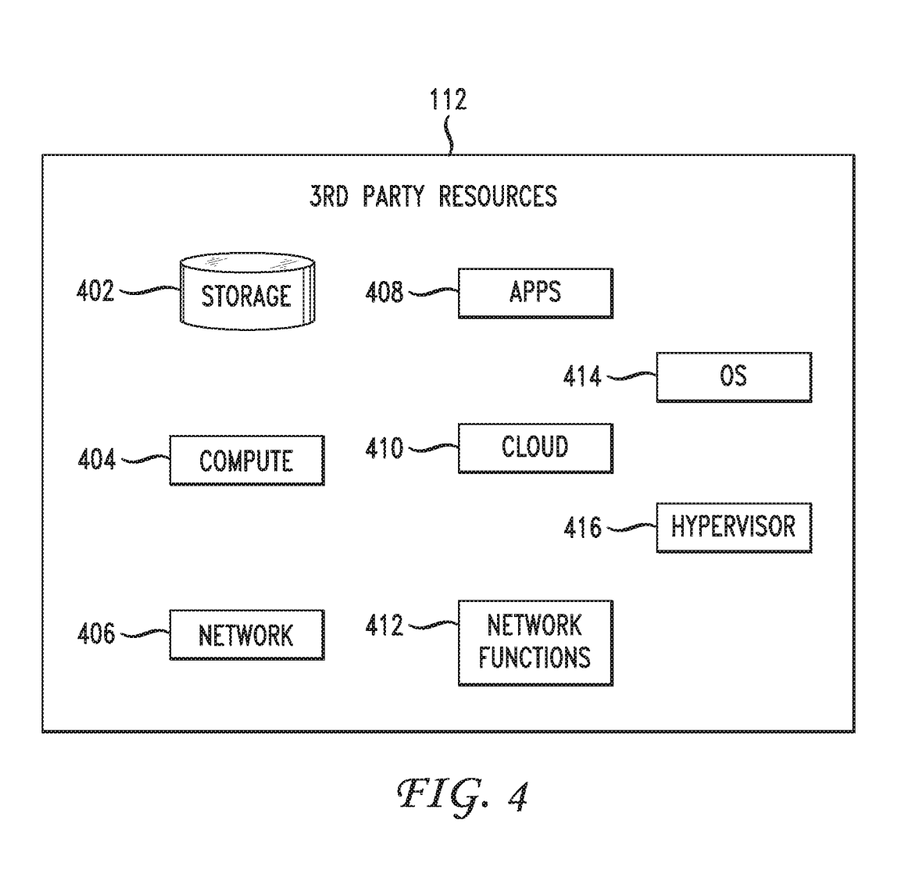
FIG. 4 depicts functional components of third party resources, in accordance with an embodiment.

FIG. 4 depicts functional components of third party resources 112, in accordance with an embodiment. Third party resources are hardware and/or software that are utilized to create or modify a product or service that are not owned, maintained, etc. by cloud network 102 but are accessible by cloud network 102. Third party resources 112 include storage 402, compute 404, and network 406 used for spinning up, instantiating, and/or storing a product or service ordered by a customer. Third party resources 112 also include applications ("apps") 408, cloud 410, network functions 412, OS 414, and hypervisor 416. Apps 408 include certain applications used for creating or modifying the order placed by a customer. Apps 408 are customizable based on the ordered product or service. Cloud 410 is a cloud networking server that is used to create or modify the order by utilizing the third party resources. Network functions 412 are used to assist in creating or modifying the order. Hypervisor 416 runs one or more virtual machines (guest machines). Hypervisor 416 runs on a computer referred to as a host machine. Hypervisor 416 presents OS 414 with a virtual operating platform and manages execution of OS 414. Additional operating systems than shown in FIG. 4 may be included. Other software management layers used to implement the cloud functions may be included.

Figure 5:
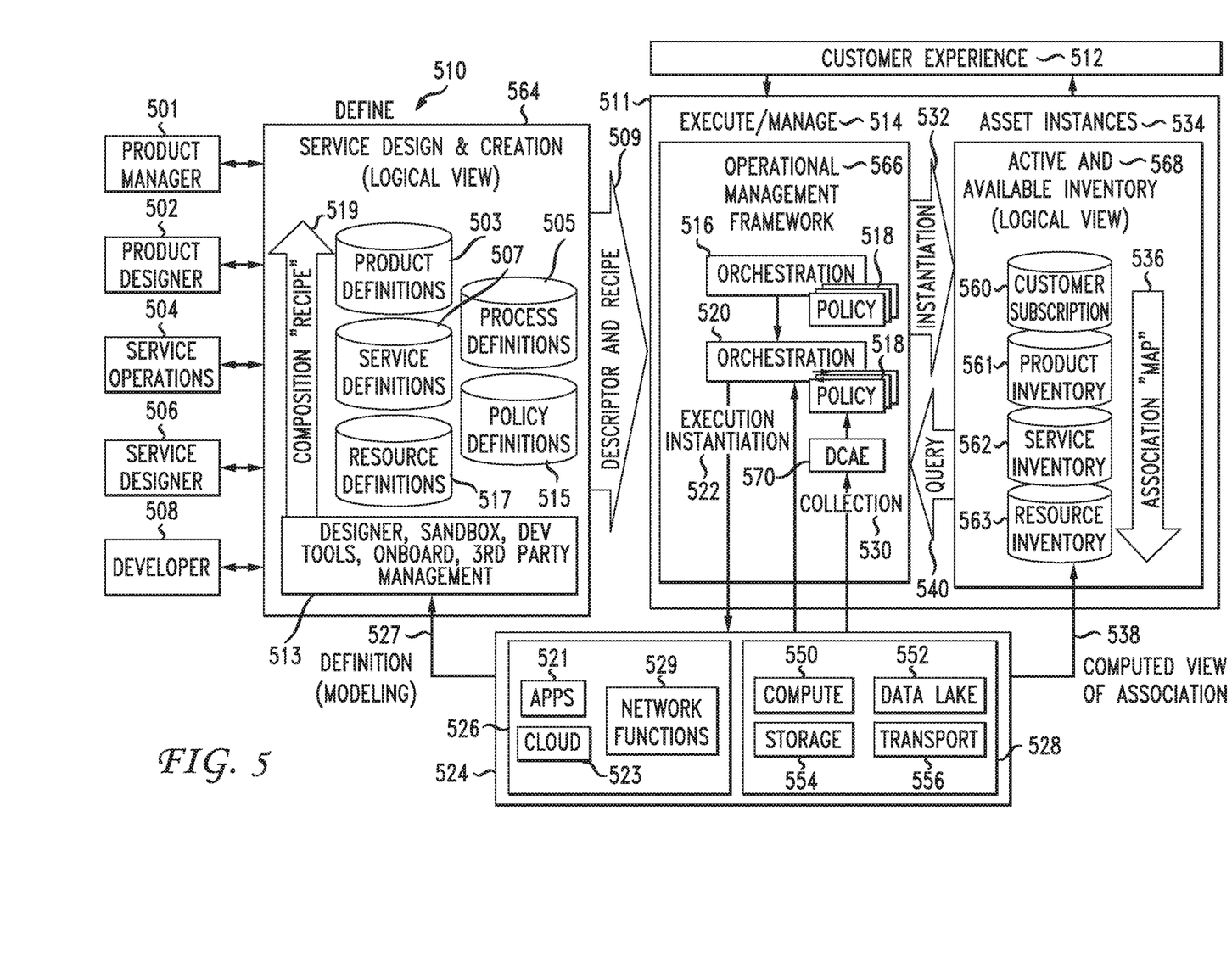
FIG. 5 depicts an exemplary logic flow, in accordance with an embodiment.

FIG. 5 depicts an exemplary logic flow, in accordance with an embodiment of the present application. The logic flow depicts how virtual network cloud capability is used to instantiate virtual resources on available technical facilities, while policy determines a location where the resources will be instantiated. A policy could be a customer-defined policy and/or a policy that is required due to government or legislative requirements related to data. An example of a policy includes a regulation that requires all data captured with respect to 911 telephone calls in a particular region be stored within that region. Also, all manipulation of data or products or services that are created in order to capture and/or execute the data must reside within the region. Further, storage of the data must be on-site at a location within the region and must not be moved outside the region.

A processing environment includes framework and a logical view providing functional areas in infrastructure that will need to gather, understand and operate data while a policy is in place. When a customer wishes to place or modify an order for a product or service, the order is placed via customer experience 512. Customer experience 512 may utilize a website, automated telephone operator, etc., that receives the order details provided by the customer. The customer identifies any policies that must be met via customer experience 512. In another embodiment, policies may be automatically set based on laws governing particular products or services (e.g., data recordings captured in a particular region, country, etc.) without input from the customer. Customer experience 512 depicts communication to and from the customer. The order is received by configuration flow 511 (via customer experience 512). Configuration flow 511 includes execute/manage 514 and asset instances 534. In order to fulfill the customer's order, execute/manage 514 receives the descriptor and recipe (shown by arrow 509) from define 510. Define 510 performs testing (e.g., testing of policies affecting the order) so that execute/manage 514 can fulfill the customer's order. Define 510 performs testing so that execute/manage 514 can perform execution and/or runtime of the order or service. In order to perform testing before instantiating the product, execute/manage 514 communicates with network resources 524, which send a definition (modeling) (shown by arrow 527) of the product or service ordered to define 510. Details regarding how the modeling or testing of the product or service is performed are described herein with respect to define 510.

Define 510 depicts service design and creation 564. Service design and creation 564 provides steps associated with the processing of the order, which are supplied as the working process template for the execute/manage 514. Service design and creation 564 is provided as a logical view, which deals with functionality provided to the customer that placed or modified the order. Service design and creation 564 is used to model and/or define resources, compose new services and products, drive (EBOE) implementation, enable operations, realize business values, and determine time to market (TTM). EBOE includes Enhanced Control, Orchestration and Management Plane (ECOMP), Business Support Functions (BSF), Operations Support Functions (OSF), and Element Support Functions (EMF). The first letters of each of these acronyms ECOMP, BSF, OSF, and EMF make up the acronym EBOE. ECOMP includes service design and creation, run-time software framework, active inventory, and service and network control. BSF is an environment in which the product or service lives. OSF and EMF are included in the resource layer which is described below.

In define 510, a composition "recipe" (shown by arrow 519) for implementing the order is constructed; that is, a blueprint or a model for the product or service is created after testing is performed. The composition "recipe" is the procedure used to process an order (or other activity), not the order itself. Define 510 takes the order and defines the processes that will take place in configuration flow 511, described below. The definition (modeling) (shown by arrow 527) of the product or service that is ordered is communicated from network resources 524 to define 510. Definitions for the product or service that are created by define 510 include product definitions 503, process definitions 505, service definitions 507, resource definitions 517, and policy definitions 515. Each of product definitions 503, process definitions 505, service definitions 507, resource definitions 517, and policy definitions 515 include a database or are comprised of a database. Product definitions 503 may include a product name and/or description. Process definitions 505 include one or more processes for creating the order. Service definitions 507 include services needed for implementation of the order. Resource definitions 517 include a list of resources needed to create the order. Policy definitions 515 include policies that must be met in creating, instantiating, storing, etc., the order. Policy definitions may include location policies. These definitions define components that need to be put together in order to create the product or service needed to fulfill the order.

In order to create the composition "recipe," define 510 communicates with product manager 501, product designer 502, service operations 504, service designer 506, and developer 508. The communication between define 510 and product manager 501, product designer 502, service operations 504, service designer 506, and developer 508 is a two-way communication, as depicted by the respective arrows shown in FIG. 5. Product manager 501 performs product realization based on the order details which is provided to define 510. Product manager 501 provides the order details to product designer 502. In an embodiment, product manager 501 does not perform any functions related to creating or modification of the product. Product manager 501 inputs the customer's order, passes the order details to product designer 502 and provides realization to define 510. Product manager is responsible for end-to-end customer experience. Product designer 502 designs the products and provides the product design to define 510. Product designer 502 forwards the order details to service operations 504. Service operations 504 perform service enablement which is provided to define 510. Service operations 504 ensure that roles and policies are in place for parties performing enablement of the product or service. Service operations 504 forwards the order details to a service designer 506. Service designer 506 creates a service design and provides the service design to define 510. Service designer 506 may include a third-party designer and/or a service designer that is employed by the same company that accepts the order and employs product manager 501 and product designer 502. Service designer 506 forwards the order details to developer 508. Developer 508 deploys resources and the resource deployment is provided to define 510.

The composition "recipe" (shown by arrow 519) is dynamically updated and is cyclical in nature. The definition (or modeling) (shown by arrow 527) of the product or service can be provided to define 510 by network resources 524, and the cycle continues by define 510 providing the definitions to configuration flow 511. Once all the definitions needed to create the order are defined, the order descriptor is complete and the recipe driven order is forwarded to configuration flow 511, as shown by arrow 509. The information forwarded from define 510 to configuration flow 511

(shown by arrow 509) is referred to as the descriptor and recipe. Execute/manage 514 provides an operational management framework 566 for providing the order. Define 510 creates a definition for all of the components needed for the composition "recipe" to fulfill the order. Configuration flow 511 uses the information from define 510 in order to build, instantiate, and execute the order (using network resources 524). In the 911 telephone call example, where the order is for a service capturing and storing all 911 telephone calls placed within a region, an instance of the order can be created by triggering an event. For example, a person dialing 911 could be an event. When the instance of the order is created, testing of the product or service is performed by define 510. The testing results in a composition "recipe," and define 510 provides the components needed for building the service (e.g., capturing 911 telephone call data) to configuration flow 511, as shown by arrow 509, after performing the testing. Specifically, box 513 reflects all of the components that are put in place for the development of the order processes and definitions and provides the list of components to configuration flow 511. Upon the instance of a customer order, application level orchestration 516 begins orchestration for building the instance of the service or product ordered. Application level orchestration 516 is governed by a policy stored within policy engine 518. Application level orchestration 516 instantiates or modifies a service or product configuration based on requirements received from define 510. The requirements may be subscribed requirements, that is, requirements that are covered under a contract between the customer and the provider (i.e., the company that accepts the order), or location-based requirements that are defined by the policy stored in policy engine 518. Policy engine 518 drives the correct behavior based on policy constraints in the instantiation of the product or service.

At the next level, service level orchestration 520 is shown. In an embodiment, application level orchestration 516 is an orchestration that is at a higher level than service level orchestration 520. As with application level orchestration 516, policy engine 518 stores a policy that states certain constraints that must be met when completing the order (e.g., location). Service level orchestration 520 is triggered by application level orchestration 516 with subscribed and/or required actions (based on the requirements provided by the policy stored in policy engine 518) by the order for a service or product. A service level policy for the order (in service level orchestration 520) executes the instantiation of network capability configuration requests with the policy stored in policy engine 518 (which provides requirements such as location policy defined parameters). The execution and instantiation is shown by arrow 522.

Network resources 524 provide service and application capabilities and network layer capabilities. Network resources 524 include network layer resource control capabilities 528 including compute 550, data lake 552, storage 554 and transport 556, and third-party resources 526 including network functions, applications ("apps"), and a third party cloud server ("cloud"). At network resources 524, network layer resource control capabilities 528 accept the policy-based instantiation (or modification, if the order is for modifying an existing product or service) request and operate against the detail physical view of the network. Network layer resource control capabilities 528 perform instantiation of the action based on the order as follows. Compute 550 performs computations for the order. The computations may utilize local or company available network resources (i.e., resources that are owned by the company, as shown in FIG. 3) and/or utilize third-party resources 526. As described above, third-party resources 526 include network functions 529, apps 521 and/or cloud 523 (e.g., a third-party cloud server). If network resources owned by the company are required by compute 550, data lake 552 may be used. Data lake 552 is an object-based storage repository that contains data in its native format until needed for computation use. If particular data is needed for the order, then data lake 552 can be called upon. Transport 556 is responsible for moving resources around. In an embodiment, if additional resources are required that are not available, transport 556 can move the needed resources so they become available. In another embodiment, transport 556 can move unused resources out of a particular location to make room for resources that are required. Storage 554 stores data used for instantiation and execution of the product or service contained in the order. Network resources 524 provide a definition (or modeling) 527 of the product or service ordered to define 510. The definition may include designer properties, Sandbox, development ("dev") tools, Onboard, and third-party management, as shown in box 513. Define 510 creates components and parts that need to be put together in order to fulfill the order and Sandbox dev tools, Onboard and third-party management test the components and parts that are provided. Network resources 524 provide a collection, as shown by arrow 530, to Data Collection, Analytics and Events (DCAE) 570, which provides it to policy engine 518 at the service level layer.

DCAE 570 analyzes data provided by network resources 524 and can make corrections to the network functions, as needed. If there is a change in policy, the change can effect orchestration. The change in policy is communicated to application level orchestration 516 and down to service level orchestration 520, which implements the change during execution/instantiation, shown by arrow 522. Network resources 524 are executed and/or instantiated based on the change. In an embodiment, a feedback loop is created between service level orchestration 520, DCAE 570, and network resources 524 shown by arrow 522 (execution/ instantiation) and arrow 530 (collection). The feedback loop provides for data collection, monitoring and analytics to support management and execution of the ECOMP control loop (which DCAE 570 is part of). Based on the change in policy, specific data used in the instantiation is collected, analyzed and made available to policy 518 or used according to the policy constraints in policy 518. The changes are carried through in the instantiation based on the changes in policy.

Network resources 524 provide information about instances in inventory. Relationships are a computed view of the associations between the instances, as shown by arrow 538, which are communicated to asset instances 534. In order to perform instantiation in the cloud to fulfill the order, the associations are evaluated and a computed view of the associations between the instances, as shown by arrow 538, is created. The computed view of the associations is based on analyzed relationships between network resources and data that is acquired to instantiate the product or service.

Asset instances 534 include active and available inventory 568, that is, both assigned and available inventory, provided as a logical view. Asset instances 534 include customer subscription 560, product inventory 561, service inventory 562, and resource inventory 563. Resources inventory 563 includes data storage, network components, software, etc. Each of customer subscription 560, product inventory 561, service inventory 562, and resource inventory 563 may include a database or is comprised of a database. Customer subscription 560 provides details regarding the customer's subscription resources. Product inventory 561 provides an inventory of products used for creating the order. Service inventory 562 maintains the services instantiated by a specific customer's order or subscribed service or product instance (that is, a recurring order the customer has subscribed to e.g., recording and storing all 911 telephone calls placed within a region). The products or services are operationalized by resources as the basis for products or services. Each service or product instance contains customer specific configurations (e.g., the customer defines or the policy a specific configuration for resources utilized to instantiate the product or service). Resource inventory 563 provides resources (e.g., network layer resource control capabilities 528 and/or third-party resources 526) that are used for creating the order. Execute/manage 514 provides instantiation of the product or service to asset instances 534, as shown by arrow 532. Asset instances 534 can be queried in the process of execute/manage processes 514, as shown by arrow 540. Active and available inventory 568 is a data structure representing the customer, product, service and/or resources data views of the cloud inventory. Association "map" is shown by arrow 536. Associations that are a part of the association "map" are the data maps that capture the relationships between the layers. For example, a resource or a set of resources that may be mapped to a service which utilizes it is an association. Similarly, the service is mapped to a product, and a product is mapped to a customer in an association map. A stack shown by customer 560, product inventory 561, service inventory 562, and resource inventory 563 provides the associations for the data map(s). The stack indicates whether resources are available in inventory to be used for fulfilling an order. If instantiation or execution of a service or product has to be moved/relocated and such relocation is permissible by the policy governing the service or policy (or there is no policy), then the stack is utilized in order to facilitate the move.

The data reflecting available and assigned inventory is used to capture and allow access to location specific parameters (as defined by policy constraints), as well as product, service and resource specific attributes. Resource inventory 563 includes physical (PNF) and virtual (VNF) elements (e.g., compute, storage, network backbone, facilities, routers, switches, topology, software, and/or applications). Resource specific attributes are specific characteristics of which define the element characteristics needed for instantiation or execution of the product or service. Resource specific attributes include item identification (ID) which identifies a resource, current and planned states of operation for a resource (e.g., pending, in place, scheduled, limited life span, etc.), physical location (e.g., the physical location of the resources, also defined by a policy for a specific order), usability (e.g., idle but running, etc.), and utilization (e.g., percentage of active time when the resource is running). These resource specific attributes can be used when determining to reallocate a resource.

In an embodiment, the processing environment depicted in FIG. 5 provides functional areas in business and technical infrastructures. The functional areas need to gather, understand and operate on data dictated by a policy (i.e., indicative of service location parameters), where the information regarding the policy is collected by the company based on the customer's input when ordering or modifying an order. In an embodiment, cloud network 102 includes product manager 501, product designer 502, service operations 504, service designer 506, developer 508, define 510, and configuration flow 511. In an embodiment, network resources 110 include network resources 524. In an embodiment, third-party resources 112 include third-party resources 526. In an embodiment, three domain areas are utilized to create a product or service that is policy based. The three domain areas are a product layer, service layer and resource layer. Policy governs the actions of the product layer, service layer and resource layer.

The product layer is responsible for determining specific products that are available and presented to a customer, gathering customer sales level information and the customer's choice of offered product attributes that will meet the customer's requirements (validation). Product rules governing specific products available, gathering customer sales level information, and the customer's choice of offered product attributes allow a customer to choose sets of resources that will meet their specific needs. The customer need not choose sets of resources, as this process may be automatic. The gathering and validation process, which drives proposal, contracting, and accounting processes require policy rules that have detailed location related rules to enforce that any location-based attributes are gathered and stored that reflect the location specific functionality (based on the policy). In an embodiment, the proposal, contracting and accounting creation processes are part of the BSF functionality that provide the end-to-end sales capability (i.e., selling to a customer, gathering information to create a contract, a proposal, etc.). After these processes are completed, a product configuration is passed to the service layer (described below) for implementation. In an embodiment, application level orchestration 516 is comprised of the product layer.

The service layer is responsible for understanding the products ordered in the product layer processes, and translating the products or services ordered to specific services defined as a technical implementation of those products or services. Additional details regarding the order may be gathered at the service layer. In an embodiment, the additional details are not product or service specific but are required for the complete instantiation of the product or service ordered.

Among the additional details that are collected, virtual process location parameters including any restrictions specific to an ordered service or product (dictated by policy) on specific boundaries for functional execution are collected. Process location parameters are validated against the specific customer contract requirements implemented by the order (placed with product manager 501 in FIG. 5) and any other policies/rules, including location restriction parameters that may apply to the product or service.

The service layer passes validated service specific orders to the resource layer for implementation. Where a solution for a customer is implemented, each orchestrator and controller, instantiated for that solution, itself will be instantiated against location parameters as well as the network, software and data service resources driven by them. In an embodiment, service level orchestration 520 is instantiated based on service layer rules and policies. Each orchestrator (application layer orchestration 516 and service level orchestration 520) is a function that arranges, sequences, and implements tasks, rules, and policies to coordinate resources (e.g., logical resources and/or physical resources). The orchestration meets a customer's order request or an order request that is created on-demand (e.g., a modification to the customer's order request, a new order created, etc.) for the creation, modification, or removal of network resources or service resources. The orchestration includes a control function which is intimate with network protocols and executes configuration, real-time policies, and controls the state of the distributed network components and services.

The resource layer is responsible for instantiating the resources necessary to implement the customer's product or service. This is accomplished by application layer orchestration 516 and subtending technology specific controllers. The tasks orchestrated are performed against specific rule-based procedures that accept the incoming service attributes, including location parameters dictated by policy, to determine the correct instantiation location and resources from those available in inventory in asset instances 534. The controllers activate and monitor the specific functions ordered.

The controllers also maintain virtual functions, within the policy dictated location boundaries when maintenance and outages require the function to be moved to a different location. In an embodiment, network resources 524 are comprised of the service layer.

Suppose that a product or service is not subject to any policy or laws. In order to move the product or service to a different location, several factors may be important. One such factor is cost. In order to maximize profit and/or to save the customer money, resources may be located in a particular location where it is less expensive to create the product and less expensive to maintain data associated with the product. If a product or service does not need to stay in a location where it was created (because no policy restricts the product or service to a location), the product or service can be moved to a more efficient location.

Figure 6:
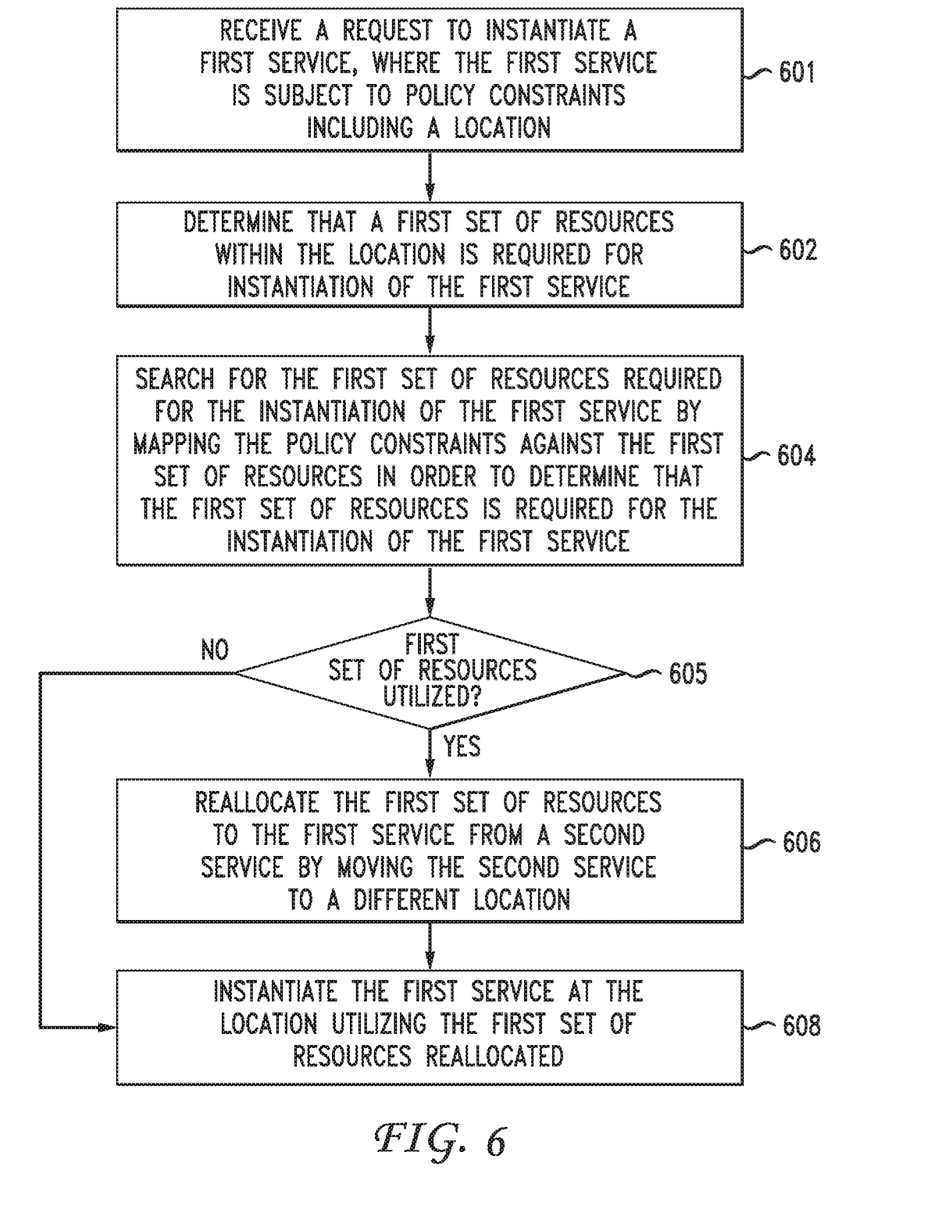
FIG. 6 is a flowchart of a method for providing a service having constraints governed by a policy, in accordance with an embodiment.

FIG. 6 is a flowchart of a method for providing a service having constraints governed by a policy. The service is provided by cloud network 102 and the following steps are performed by cloud server 202 of cloud network 102.

At step 601, a request to instantiate a first service is received. The first service is subject to policy constraints including a location. Customer 104 requests instantiation of a first service. Cloud server 202 receives the request sent by customer 104, via network 106. Customer 104 indicates that the first service is subject to policy constraints including a location. The policy constraints pertain to a location of the storage and instantiation for the data associated with the service.

For example, suppose that an enhanced 911 (E911) or next generation 911 (NG911) emergency service provider of the city of Malibu in California wishes to create an order for a service or modify an existing order for a service. The order is governed by a policy that mandates that the entire system used to create the order must run within Los Angeles County and all associated 911 related data, network communications, and processing of the 911 service must be stored within Los Angeles County for 911 calls made within Malibu. Examples of data include all incoming recorded phone calls. The policy also states that no associated data is allowed to leave the county. In an embodiment, the order and policy details are provided to product manager 501 in FIG. 5.

The company accepting the order delivers functions required to meet the policy constraints.

At step 602, it is determined that a first set of resources within the location is required for instantiation of the first service. Cloud server 202 receives the request for the order and determines that a first set of resources within the location is required for instantiation of the first service.

In an embodiment, the first set of resources may be network resources 110 that are free (i.e., not being utilized by other services). In the embodiment depicted by the flowchart of FIG. 6, the first set of resources may not be free (i.e., are currently utilized by other services). The first set of resources may be third party resources 112 or network resources 110. In yet another embodiment, the first set of resources may be a combination of network resources 110 and third party resources 112.

In an embodiment, the first set of resources comprise storage 402, compute 404 and network 406 resources. The first set of resources is spun-up virtually by cloud server 202 at a location (e.g., Malibu). The first set of resources may be spun-up virtually for purposes of being utilized by a specific order for a product or service or generally spun-up to be utilized by any product or service that requires the resources.

At step 604, a search is conducted for the first set of resources that is required for the instantiation of the first service by mapping the policy constraints against the first set of resources to determine that the first set of resources is required for the instantiation of the first service. Cloud server 202 conducts a search for the first set of resources required for instantiation of the first service by mapping the policy constraints against the first set of resources to determine that the first set of resources is required for the instantiation of the first service.

Figure 7:
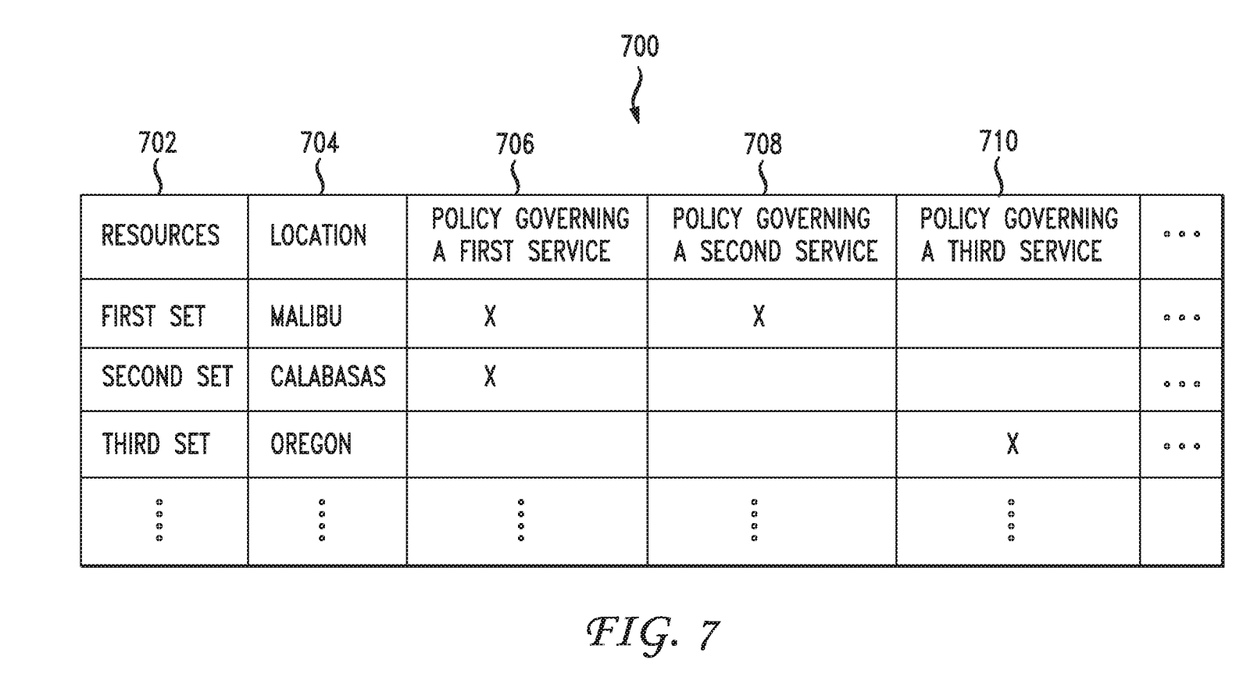
FIG. 7 depicts a mapping of resources, location, and policy governing services, in accordance with an embodiment.

As shown in FIG. 7, a mapping 700 is performed showing resources and location mapped out against policy constraints. Resources column 702 provides a first set of resources, a second set of resources, a third set of resources, . . . , etc. The location of each of the resources is provided in location column 704. A policy governing a first service is provided in column 706. All sets of resources that can be utilized in line with the policy governing the first service are indicated by an "X." In the depicted example, a first set of resources located in location A (e.g., Malibu) and a second set of resources located in location B (e.g., Calabasas) can be utilized by the first service because these resources are within a location acceptable by the policy. In the example described above, the first service is governed by a policy constraint restricting the resources to be located within Los Angeles county. A policy governing a second service is provided in column 708. The policy constraint restricts the second service to be computed, instantiated and stored within the city of Malibu and utilizes the first set of resources. Therefore, the first set of resources can be utilized by the second service and the mapping indicates this as there is an "X" located in column 708 in the row marked "first set." The policy constraint restricts the third service to be computed, instantiated and stored within the state of Oregon. Therefore, a third set of resources can be utilized by the third service and the mapping indicates this as there is an "X" located in column 710 in the row marked "third set". In an embodiment, if a service is not governed by a policy constraint defining a location, all available resources can be mapped to the service (and an "X" would be placed in each row of resources). Additional policies, locations, and resources than depicted in FIG. 7 may be provided. The mapping depicted is shown for exemplary purposes only and any mapping of policy constraints against the sets of resources can be used.

At step 605, it is determined whether the first set of resources is being utilized or not. Cloud server 202 determines whether the first set of resources is currently utilized or not. If the first set of resources is being utilized, that means that the first set of resources is not available, and the process proceeds to step 606. Specifically, when cloud server 202 determines that the first set of resources is utilized by a particular service (e.g., a second service) by analyzing the mapping in FIG. 7, the process proceeds to step 606. If the first set of resources is not being utilized and is available (i.e., the mapping in FIG. 7 does not list the first set of resources as being utilized by any particular service), the process proceeds to step 608. Specifically, when cloud server 202 determines that the first set of resources is available and not being utilized, the process proceeds to step 608.

At step 606, the first set of resources is reallocated to the first service from a second service by moving the second service to a different location. Cloud server 202, after determining that the first set of resources is utilized by a second service at step 605, reallocates the first set of resources to the first service from the second service by moving the second service to a different location. Another set of resources is reallocated to the second service in the different location. Cloud server 202 moves the second service to a different location and reallocates another set of resources to the second service in the different location. In an embodiment, as the second service is not governed by a location-based policy, the second service can be reallocated to a different location. If however, the second service is governed by a location-based policy, then the second service is reallocated to the different location while still meeting the policy constraints. For example, if the policy constraints restrict the location to the state of California, then the second service is reallocated to a different city in California, a different data center within the city, region, county, state, etc. Referring now to FIG. 7, the mapping shows that the first set of resources located in Malibu are mapped to (and are utilized by) the policy governing the second service. The first set of resources is reallocated to the first service from the second service and the second service is moved to a different location. That is, the first set of resources in Malibu is reallocated to the first service from the second service.

In an embodiment, the second service may be finished using the first set of resources and therefore, the reallocation can be performed without affecting the second service. In another embodiment, suppose that the second service can utilize resources in Burbank as well as Malibu (based on policy constraints if there is a policy). Resources in Burbank may be allocated (or reallocated) to the second service so that the second service does not experience a disruption when the first set of resources is reallocated to the first service. In another embodiment, if the order covering the second service does not indicate that the second service is time-sensitive, the first set of resources may be reallocated and the second service does not need to move to a different location. When the first service is finished utilizing the first set of resources, they can be reallocated back to the second service and the order for the second service is fulfilled.

At step 608, the first service is instantiated at the location utilizing the first set of resources reallocated. Cloud server 202 instantiates the first service at the Malibu location by utilizing the first set of resources that is reallocated in step 608.

In an embodiment, after determining that the first set of resources is not utilized in step 605, the process proceeds to step 608, where the first service is instantiated at the location utilizing the first set of resources that is reallocated (or assigned) to the service.

As described above, the policy constraints governing the first service may include various technical, contractual, governmental and/or legal constraints in terms of the specific behavior of the first service that is instantiated. Specifically, these requirements can mandate the specific physical location or location areas of where the functional parts of a delivered service will actually run. Cloud server 202 of cloud network 102 utilizes Network Function Virtualization (NFV) and Software Defined Networks (SDN) technologies to separate hardware and software functionality. The architecture of cloud network 102 will have the necessary functional policy and service component instantiation capabilities to recognize the location of a user (e.g., in the 911 case, the user being the caller) and the system functionality to implement the application instance, communication connections and data storage (e.g., customers call and conversation with the service) within the specific state the call originated in, where that rule applies.

The policy constraints may also be based on system or business requirements defined by a customer. The system or business requirements may be implemented as policy by the customer and can be manipulated or changed by the customer. The customer may implement policies based on internal company requirements. For example, the customer may wish to internally set a policy constraint limiting the location of the instantiation of a service to be within the state of Oregon. In another example, the customer may request that the spinning up of the service be done in an efficient manner in order to minimize delay. This request would be provided within the policy set forth by the customer and would be implemented when fulfilling the customer's order. The customer can change or remove policy constraints based on dynamic system or business requirements. In an embodiment, an order placed by the customer may be subject to legal and/or business requirements set forth in the policy as policy constraints.

In accordance with an embodiment, suppose that cloud server 202 receives a request, via network 106, from customer 108 to instantiate a third service in real-time, where the third service is subject to policy constraints including a location. Customer 108 may request a service that is time-sensitive and requires immediate attention from cloud server 202. Suppose that the policy constraints list the location as Calabasas. Cloud server 202 may also receive a request to instantiate a fourth service (sent from one of customer 104 or customer 108, or another customer not shown in FIG. 1) via network 106 at the location (i.e., Calabasas). Cloud server 202 determines that a second set of resources at the location (i.e., Calabasas) is required for instantiation of the third service and the fourth service. Such a determination may be made based on mapping 700. Cloud server 202 prioritizes instantiation of the third service over the fourth service, since the third service is to be instantiated in real-time and is time-sensitive. The instantiation of the third service is prioritized by delaying instantiation of the fourth service. Cloud server 202 then allocates the second set of resources to the third services. The third service is then instantiated at the location (i.e., Calabasas) substantially in real-time by utilizing the second set of resources.

After the third service is instantiated, and data associated with the third service instantiated is stored (e.g., within storage 312), the second set of resources may be freed up and can be spun-up for a different service. The fourth service is then instantiated, by cloud server 202, at the location (i.e., Calabasas) by utilizing the second set of resources that were freed up. Data related to the fourth service instantiated at the location (i.e., Calabasas) is stored (e.g., within storage 312). Cloud server 202 then receives a request to instantiate a fifth service that is subject to policy constraints including a location (i.e., Calabasas). Cloud server 202 then determines that the second set of resources at the location (i.e., Calabasas) is required for instantiation of the fifth service. The determination is made based on mapping 700. Cloud server 202 transfers or moves the data related to the fourth service that was stored within storage 312 to a different location. In an embodiment, the fourth service is not subject to any policy constraints that include a location, so data related to the fourth service can be stored anywhere. Various factors may be used to determine the optimal location to move the data to. These factors include cost, energy, power, connectivity, proximity, and/or performance. It may be determined that the data related to the fourth service that is instantiated be moved to Oregon, within storage 320. The second set of resources that were previously allocated to the fourth service are then reallocated by cloud server 202 to the fifth service and the fifth service is instantiated at the location (i.e., Calabasas) utilizing the second set of resources allocated.

In another embodiment, cloud server 202 receives a request to modify the first service. Customer 104 sends the request to cloud server 202, via network 106. Cloud server 202 determines that a second set of resources at the location (i.e., Malibu) is required for the modification of the first service. Cloud server 202 then reallocates the first set of resources to the first service from a second service. For example, a second service could currently or previously be utilizing the second set of resources in Malibu. Cloud network 102 instantiates the first service at the location utilizing the first set of resources reallocated.

In an embodiment, the resources could be network resources 110, third party resources 112 or a combination of network resources 110 and third party resources 112. Furthermore, mapping 700 in FIG. 7 depicts exemplary sets of resources only and additional sets of resources then depicted may be provided at any of the locations.

Although the above refers to a method for providing a service, the same steps may be performed for providing a product (or a combination of a service or product).

Location based virtualized instantiation of data and virtualized storage on hardware that is located in data centers can be provided to customers while policy rules are in place for the data and storage. When a change in law or policy occurs, the change can be implemented remotely without having to change the hardware used to instantiate or store the data. Proper resources within a particular location can be dedicated to the product or service provided to customers, and when necessary, resources can be reallocated during low utilization or inactive periods. This results in a reduction of stranded resources. Customer requirements can be better met in a more efficient manner by reallocating resources. Resources can be updated and reallocated based on performance needs of a customer. If a policy states that data must be stored within a particular location, virtualized storage is made available according to the policy and is kept requisite to the policy constraints.

Figure 8:
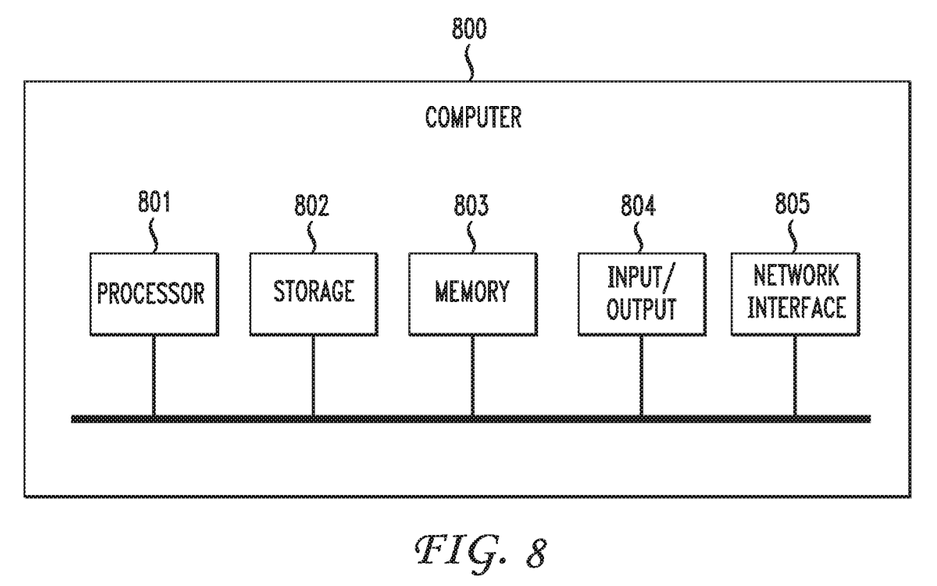
FIG. 8 illustratively depicts components of a computer that may be used to implement various embodiments.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIG. 6 can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIG. 6. Accordingly, by executing the computer program instructions, the processor 801 executes an algorithm defined by the method steps of FIG. 6. Computer 800 also includes one or more network interfaces 805 for communicating with other devices via a network. Computer 800 also includes one or more input/output devices 804 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate lists (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 804 may include peripherals, such as a printer, scanner, display screen, etc. For example, input/output devices 804 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including network resources 110, $3^{rd}$ party resources 112, cloud network 102, cloud server 202, processor 204, memory 206, routers 208, commodities 210, storage 304, compute 306, network 308, OS 305, hypervisor 307, storage 312, compute 314, network 316, OS 315, hypervisor 317, storage 320, compute 322, network 324, OS 325, hypervisor 327, storage 402, compute 404, network 406, apps 408, cloud 410, network functions 412, OS 414, hypervisor 416, define 510, execute/manage 514, asset instances 534, network resources 524, and third party resources 526 may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving a request to instantiate a first service, wherein the first service is subject to a policy constraint of a policy, and wherein the policy constraint designates that processing associated with the first service remains within a location boundary;
determining a particular location within the location boundary to instantiate the first service based on the policy constraint, wherein determining the particular location within the location boundary comprises
determining that a first set of resources is required for the first service at the particular location, and
determining that the particular location comprises the first set of resources;
reallocating the first set of resources to the first service from a second service utilizing the first set of resources;
instantiating the first service at the particular location; and
moving the second service to a location different from the particular location, wherein the second service is not subject to the policy constraint of the policy.

2. The method of claim 1, wherein the policy constraint further designates that physical hardware supporting computing associated with the first service must be located within the location boundary.

3. The method of claim 1, wherein the policy constraint further designates that physical hardware supporting storage associated with the first service must be located within the location boundary.

4. The method of claim 1, wherein the policy constraint further designates that physical hardware supporting networking associated with the first service must be located within the location boundary.

5. An apparatus comprising:
a processor; and
a memory to store computer program instructions, the computer program instructions when executed on the processor cause the processor to perform operations comprising:
receiving a request to instantiate a first service, wherein the first service is subject to a policy constraint of a policy, and wherein the policy constraint designates that processing associated with the first service remain within a location boundary,
determining a particular location within the location boundary to instantiate the first service based on the policy constraint, wherein determining the particular location within the location boundary comprises
determining that a first set of resources is required for the first service at the particular location, and
determining that the particular location comprises the first set of resources,
reallocating the first set of resources to the first service from a second service utilizing the first set of resources,
instantiating the first service at the particular location, and
moving the second service to a location different from the particular location, wherein the second service is not subject to the policy constraint of the policy.

6. The apparatus of claim 5, wherein the policy constraint further designates that physical hardware supporting computing associated with the first service must be located within the location boundary.

7. The apparatus of claim 5, wherein the policy constraint further designates that physical hardware supporting storage associated with the first service must be located within the location boundary.

8. The apparatus of claim 5, wherein the policy constraint further designates that physical hardware supporting networking associated with the first service must be located.

9. A non-transitory computer readable medium storing computer program instructions, which, when executed on a processor, cause the processor to perform operations comprising:
receiving a request to instantiate a first service, wherein the first service is subject to a policy constraint of a policy, and wherein the policy constraint designates that processing associated with the first service remain within a location boundary;
determining a particular location within the location boundary to instantiate the first service based on the policy constraint, wherein determining the particular location within the location boundary comprises
determining that a first set of resources is required for the first service at the particular location, and
determining that the particular location comprises the first set of resources;
reallocating the first set of resources to the first service from a second service utilizing the first set of resources;
instantiating the first service at the particular location; and
moving the second service to a location different from the particular location, wherein the second service is not subject to the policy constraint of the policy.

10. The non-transitory computer readable medium of claim 9, wherein the policy constraint further designates that physical hardware supporting computing associated with the first service must be located within the location boundary.

11. The non-transitory computer readable medium of claim 9, wherein the policy constraint further designates that physical hardware supporting storage associated with the first service must be located within the location boundary.

* * * * *